Figure 1:
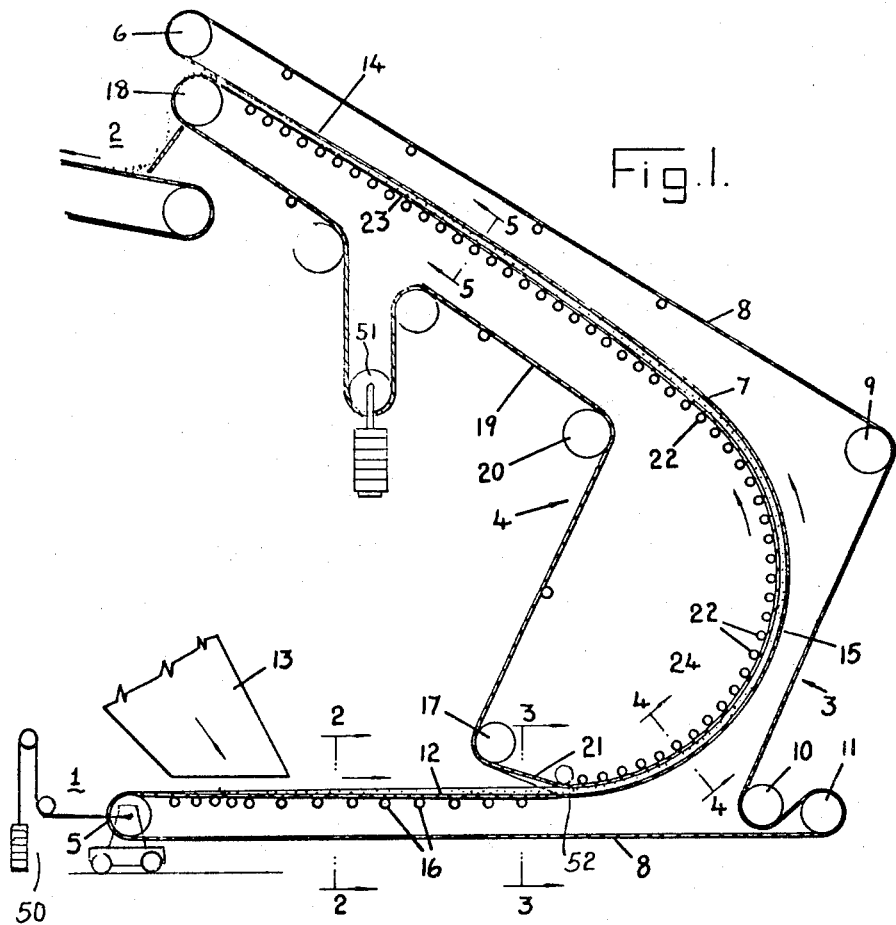

United States Patent [19]
Yateman et al.

[11] 3,805,946
[45] Apr. 23, 1974

[54] CONVEYOR APPARATUS
[75] Inventors: Earl W. Yateman; Anthony D. Janitsch, both of Belleville, Ontario; Warren R. Vaughan, Kingston, Ontario, all of Canada
[73] Assignee: Borg-Warner (Canada) Ltd., Oakville, Ontario, Canada
[22] Filed: May 11, 1973
[21] Appl. No.: 359,381

Related U.S. Application Data
[63] Continuation of Ser. No. 158,197, June 30, 1971, abandoned.

[52] U.S. Cl. ............................. 198/165, 198/162
[51] Int. Cl. ............................................ B65g 15/14
[58] Field of Search ........................... 198/165, 162

[56] References Cited
UNITED STATES PATENTS
2,978,095  4/1961  Jenike ................................ 198/165
3,618,746  11/1971  Suloff ................................ 198/165

FOREIGN PATENTS OR APPLICATIONS
713,552  9/1966  Italy .................................. 198/165
1,259,238  1/1968  Germany .......................... 198/165

Primary Examiner—Evon C. Blunk
Assistant Examiner—Joseph E. Valenza
Attorney, Agent, or Firm—Donald W. Banner

[57] ABSTRACT

A belt elevator for elevating loose bulk material from one level to another, comprises a pair of cooperating endless belt conveyors whose forward runs are juxtaposed in face to face edge sealing engagement, the material being retained therebetween. One belt conveyor provides a troughed entry portion, and the other belt conveyor provides a troughed entry portion, and the other belt conveyor provides a troughed portion extending along a curved path to a discharge point at the higher level, the belts being maintained in tension and the first belt engaging the troughed portion of the second belt and serving as a hugger belt therefor.

3 Claims, 5 Drawing Figures

CONVEYOR APPARATUS

This a continuation of application Ser. No. 158,197 filed 6/30/71 now abandoned.

This invention relates to conveyor apparatus for elevating loose bulk material from one level to another, and in particular to conveyor apparatus which can be used in relatively confined spaces, as for example in self-unloading ships.

Elevating equipment currently used in self-unloading ships may be of the bucket elevator type or the belt conveyor type. The former type of equipment is expensive to install, and suffers from the disadvantage of providing a surging rather than a continuous flow of material at the discharge point. The latter type of equipment necessarily occupies a great deal of space because the inclination of a conventional belt elevator is restricted to a maximum angle of about 18°; moreover, it is generally necessary to provide a number of transfer points at which material is transferred from one belt to another, and this frequently results in a high degree of degradation of the material.

It is an object of the present invention to provide a belt conveyor apparatus for elevating material from one level to another, which apparatus is particularly suitable for elevating loose bulk material, eliminates the need for multiple transfer points, and occupies considerably less space than would be necessary for a conventional belt or bucket elevator system.

Apparatus in accordance with the invention comprises a pair of endless belt conveyors the forward runs of which are juxtaposed in face to face edge sealing relation to define a tubular carrier wherein the material is clamped between the belts. One belt conveyor includes a substantially horizontal, upwardly facing entry protion, an upwardly inclined, downwardly facing terminal portion, and a concavely curved intermediate portion, the entry portion being troughed. The other conveyor includes a downwardly facing entry portion defining with the entry portion of the first conveyor a bight between the conveyors, an upwardly inclined, troughed, upwardly facing terminal portion, and a convex intermediate portion. Each belt over the upwardly facing portion of its forward run serves as a troughed conveyor, and each belt over the downwardly facing portion of its forward run serves as a retainer or hugger belt engaging the troughed carrier portion of the other. Both belts are maintained in tension by automatic tensioning means to compensate for belt stretch.

It will be appreciated that the clamping or mutually hugging action of the belts removes the limitation on the steepness of inclination which is characteristic of conventional belt elevators. In the present system material is initially conveyed horizontally, then upwardly along a curved path towards and past, a vertical position and on towards the discharge point at the higher level.

Figure 2:
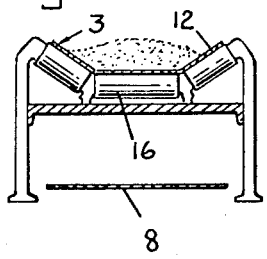
Figure 3:
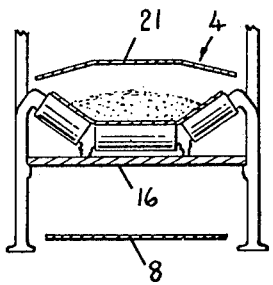
Figures 4, 5:
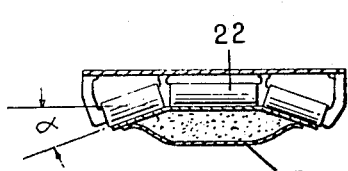

One conveyor apparatus in accordance with the invention will now be described, by way of example, with reference to the accompanying diagrammatic drawing, in which:

FIG. 1 is a side view of the ayparatus;
FIG. 2 is a section on line 2 — 2 in FIG. 1;
FIG. 3 is a section on line 3 — 3 in FIG. 1;
FIG. 4 is a section on line 4 — 4 in FIG. 1, and
FIG. 5 is a section on line 5 — 5 in FIG. 1.

Referring to the drawing, the apparatus is designed for conveying loose bulk material from a first level 1 to a higher level 2, and comprises first and second cooperating endless belt conveyors 3, 4. The first belt conveyor 3 extends between supporting pulleys 5 and 6 which are disposed at the lower and higher levels respectively and provide a forward run 7 and a return run 8. The belt conveyor passes round a main bend pulley 9, a snub pulley 10, and a main drive pulley 11 as well as the supporting pulleys 5 and 6. The forward run of the belt conveyor 3 includes a substantially horizontal, upwardly facing entry portion 12, onto which the material is fed from a hopper 13, an upwardly inclined, downwardly facing terminal portion 14, and a concavely curved intermediate portion 15. The entry portion 12, which need not be absolutely horizontal but can be inclined at an angle of up to about 18°, is supported on troughing rollers 16.

In order to compensate for belt stretch and to maintain the belt conveyor 3 under tension at all times, the supporting pulley is connected to an automatic tensioning device 50 which applies a constant horizontal force to the pulley.

The belt conveyor 4, which is preferably from 4 to 8 inches wider than the conveyor 3, extends between supporting pulleys 17 and 18 which are disposed at the lower and higher levels, and which provide a forward run in juxtaposed face to face relation with the forward run of the first belt conveyor, and a return run 19. The return run 19 passes over a take up pulley 20, and in order to compensate for belt stretch and to maintain the belt conveyor 4 under tension at all times the return run of the conveyor is connected to an automatic tensioning device 51 which applies a constant tensioning force to the belt.

The forward run of the conveyor 4 includes a short, downwardly facing, entry portion 21 which defines with the entry portion 12 of the belt conveyor 3 a bight through which the material passes between the belts to be clamped thereby. The belt conveyor passes over an impact idler 52 to minimize wear on the belt. The greater part of the forward run is supported by a series of troughing rollers 22 so as to follow a convex curve having an upwardly inclined terminal portion 23 of large radius and an intermediate portion 24 of small radius. It will be noted that the material-engaging surface of the belt 4 passes from a downwardly facing configuration at the entry portion 21 to a troughed upwardly facing configuration at the terminal portion 23.

It has been found that in order to achieve the most effective edge to edge seal between the faces of the belts 3 and 4, the spacing of the rollers 22 supporting at least the curved intermediate portion 24 of the belt conveyor 23 is important. For best results the spacing between the axes of adjacent rollers should be between eight and fourteen inches, preferably about twelve inches. Moreover, these rollers should provide a troughing angle of from 15° to 25°, the troughing angle being the angle subtended between the central and side portions of the troughed belt as indicated by the angle $x$ in FIG. 4.

In operation of the elevator, material discharged from the hopper 12 is conveyed by the entry portion 11 of the belt 3, which is supported in the shape shown in FIG. 2. As the material enters the bight provided by the entry portion 21 of the belt 4, the latter closes down on the material as shown in FIG. 3, and is in full edge sealing engagement with the belt 3 for the remainder of the forward run, during which the belt 4 acts as a troughing belt conveyor and the belt 3 acts as a retainer or hugger belt. The material is thus conveyed along a curved path to the higher level 2, from which is discharged onto a conveyor belt 24 which conveys it to the desired point at the higher level. The same apparatus may obviously be used as a lowering device for lowering material from the higher level to the lower level.

We claim:

1. Apparatus for conveying loose bulk material from one level to a higher level, and generally in the opposite direction, comprising first and second endless belt conveyors extending between respective pairs of supporting pulleys disposed at the respective levels and providing for each conveyor a forward run and a return run, each of said belts being essentially uniform in thickness and having sufficient transverse flexibility to be troughable, said second belt being wider than said first belt, and first and second automatic tensioning means connected respectively to the first and second belt conveyors for maintaining each belt conveyor in a state of tension, the forward work run of the first belt conveyor including an upwardly facing substantially horizontal entry portion, a downwardly facing upwardly inclined terminal portion, and a concavely curved intermediate portion of greater than 90°, the forward run of the second belt conveyor including a downwardly facing entry portion defining with a portion of said entry portion of the first belt conveyor a bight between the conveyors to receive loose bulk material therebetween and be elevated thereby, an upwardly facing and upwardly inclined terminal portion terminating at the higher level, and a convexly curved intermediate portion in edge sealing engagement with the intermediate portion of said first belt conveyor, the entry portion of the first belt conveyor being supported by roller troughing means so as to trough the entry portion of the first belt conveyor; the intermediate and terminal portions of the second belt conveyor being supported by roller troughing means so as to trough the second belt conveyor throughout its intermediate and terminal portions, and the supporting pulleys and roller troughing means maintaining the forward runs of the belt conveyors in face-to-face edge sealing engagement over the intermediate and terminal portions thereof.

2. Apparatus according to claim 1 in which the second belt conveyor passes over an impact idler, the impact idler being positioned to define the commencement of said convexly curved intermediate portion of the second belt conveyor.

3. Apparatus according to claim 2 in which the roller troughing means supporting the intermediate portion have a troughing angle of from 15° to 25°.

* * * * *